US010671902B2

(12) United States Patent
Ophardt et al.

(10) Patent No.: US 10,671,902 B2
(45) Date of Patent: Jun. 2, 2020

(54) METHOD PROVIDING SUPERIMPOSED QR CODE FOR DISPENSER AND REPLACEABLE RESERVOIR

(71) Applicant: OP-Hygiene IP GmbH, Niederbipp (CH)

(72) Inventors: Heiner Ophardt, Arisdorf (CH); David Duncan, St. Catharines (CA); Hendrik Ophardt, Vineland (CA)

(73) Assignee: OP-Hygiene IP GmbH, Niederbipp (CH)

( * ) Notice: Subject to any disclaimer, the term of this patent is extended or adjusted under 35 U.S.C. 154(b) by 0 days.

(21) Appl. No.: 16/269,400

(22) Filed: Feb. 6, 2019

(65) Prior Publication Data

US 2019/0318213 A1    Oct. 17, 2019

Related U.S. Application Data

(63) Continuation of application No. 15/595,048, filed on May 15, 2017, now Pat. No. 10,242,301.

(30) Foreign Application Priority Data

May 17, 2016   (CA) ..................................... 2930323

(51) Int. Cl.
    *G06K 19/06*      (2006.01)
    *A47K 5/12*       (2006.01)
    *B65D 50/00*      (2006.01)

(52) U.S. Cl.
    CPC .......... *G06K 19/06037* (2013.01); *A47K 5/12* (2013.01); *A47K 5/1202* (2013.01);
    (Continued)

(58) Field of Classification Search
    CPC ............ G06K 19/06037; G06K 19/00; G06K 19/06056; G06K 19/06093; B65D 50/00; B65D 2555/02; A47K 5/1202; A47K 5/12; B67D 7/344; B67D 7/346; B67D 7/348; B67D 1/0078; G06F 17/30725; G06F 17/30879; B05B 11/0054; B05D 2583/005
    (Continued)

(56) References Cited

U.S. PATENT DOCUMENTS 5,373,970 A    12/1994   Ophardt
5,836,482 A    11/1998   Ophardt et al.
(Continued)

FOREIGN PATENT DOCUMENTS

AU    2015252056    11/2015
EP       2322067     5/2011
(Continued)

*Primary Examiner* — Paul R Durand
*Assistant Examiner* — Robert K Nichols, II
(74) *Attorney, Agent, or Firm* — Thorpe North & Western, LLP

(57) ABSTRACT

A dispenser with a replaceable cartridge containing a product to be dispensed, and a housing configured to removably receive the cartridge. The cartridge has a surface that is marked with a first marking, and the housing has a surface that is marked with a second marking. The housing is configured so that, when the cartridge is received by the housing, the first marking and the second marking together form a machine readable code that is detectable from outside of the housing.

20 Claims, 14 Drawing Sheets

(52) U.S. Cl.
CPC .......... *A47K 5/1207* (2013.01); *A47K 5/1217* (2013.01); *B65D 50/00* (2013.01); *B65D 2555/02* (2013.01)

(58) Field of Classification Search
USPC ........ 222/325, 181.1, 23, 154; 235/375, 494
See application file for complete search history.

(56) References Cited

U.S. PATENT DOCUMENTS

| | | |
|---|---|---|
| 7,984,825 B2 | 7/2011 | Ophardt et al. |
| 8,113,388 B2 | 2/2012 | Ophardt et al. |
| 8,684,236 B2 | 4/2014 | Ophardt |
| 2004/0104241 A1 | 6/2004 | Broussard et al. |
| 2006/0235726 A1* | 10/2006 | Paraison ............. G06F 19/3456 705/2 |
| 2008/0116295 A1 | 5/2008 | Cronin et al. |
| 2008/0118255 A1 | 5/2008 | Cronin et al. |
| 2010/0282772 A1 | 11/2010 | Ionidis |
| 2012/0254052 A1 | 10/2012 | Gao |
| 2013/0020351 A1 | 1/2013 | Pelfrey |
| 2014/0196811 A1 | 7/2014 | Ramos et al. |
| 2014/0284382 A1 | 9/2014 | Park |
| 2015/0190827 A1 | 7/2015 | Ophardt et al. |

FOREIGN PATENT DOCUMENTS

| | | |
|---|---|---|
| WO | 98/50882 A | 11/1998 |
| WO | 2004010920 A1 | 2/2004 |
| WO | 2008075975 | 6/2008 |
| WO | 2015089555 | 6/2015 |
| WO | WO2015089555 | 6/2015 |

* cited by examiner

METHOD PROVIDING SUPERIMPOSED QR CODE FOR DISPENSER AND REPLACEABLE RESERVOIR

RELATED APPLICATION

This application is a continuation of co-pending U.S. patent application Ser. No. 15/595,048 filed May 15, 2017 and claims the benefit of 35 U.S.C. 120.

FIELD OF THE INVENTION

This invention relates to product dispensers and replaceable product containing cartridges that are marked with machine readable codes, such as UPC codes or QR codes. More particularly, the invention provides a liquid dispenser having a machine readable code that is formed by superimposing a first marking, located on the dispenser housing, over a second marking, located on the dispenser reservoir.

BACKGROUND OF THE INVENTION

Product dispensers that receive and dispense products from a removable and replaceable cartridge or reservoir are known. For example, many hand cleaning liquid dispensers have a housing that is configured to receive a replaceable cartridge containing the liquid to be dispensed. Once all of the liquid contained in the cartridge has been dispensed, the cartridge is removed from the housing and replaced with a new cartridge.

Often, the housing portion of these dispensers is provided to customers at a low cost, and the supplier is compensated through sales of the replaceable cartridges. This source of revenue may be lost, however, if customers begin using replacement cartridges purchased from a competitor. To avoid this loss of revenue, dispensers are often provided with manufacturer-specific lockout systems that are designed to prevent the use of third-party refill products. These lockout systems may be expensive to design and implement, may increase the complexity of the replacement operation, and may not always offer complete protection against the use of third-party products.

SUMMARY OF THE INVENTION

To at least partially overcome some of the disadvantages of previously known devices, the invention provides a dispenser that is configured to provide a machine readable code that indicates when a replaceable reservoir component of the dispenser has been received by a reusable housing component of the dispenser. The present inventors have appreciated that this machine readable code may be used to track the refill history of the dispenser and/or to provide various benefits to customers.

For example, in some embodiments of the invention, the replaceable reservoir is marked with a first marking and the housing is marked with a second marking, and the markings are arranged so that, when the reservoir is received by the housing, the first marking and the second marking together form a machine readable code, such as a barcode. This may be achieved, for example, by arranging a first part of the barcode on the replaceable reservoir at a position that sits immediately under a transparent window of the housing, and placing a second part of the barcode directly on the transparent window, so that the second part is superimposed over the first part so as to form the complete barcode when the replaceable reservoir is received by the housing. The barcode can be read by any suitable barcode reader, such as a smartphone equipped with a camera and appropriate software.

The barcode can be used for a variety of purposes, such as tracking usage of the dispenser and/or providing discounts or other benefits to customers. For example, the barcode could contain data that, when read by a compatible device, causes the device to display a rebate code. This rebate code would provide an incentive to purchase replacement reservoirs from the original manufacturer, and could thus be used to complement or replace a manufacturer-specific lockout system.

The barcode may also contain data that, when read by a web-connected device such as a smartphone, instructs the device to transmit information to a usage tracking system operated by the manufacturer. The transmitted information would preferably uniquely identify both the housing and the reservoir, and could be used by the manufacturer to monitor the rate at which each dispenser is being refilled. An absence of transmitted data for a particular housing would provide an indication that the dispenser is not being refilled with replacement reservoirs purchased from the original manufacturer.

To encourage customers to scan the barcode, a rebate code may be included as described above. Alternatively, the usage tracking information could be shared with the customer, allowing the customer to easily track the rate at which its dispensers are being refilled. This may be useful, for example, for monitoring hand cleaning compliance in a health care facility. For example, the usage tracking information would allow the operator of a health care facility to identify dispensers that are being refilled infrequently, which could provide an indication that the workers stationed in the surrounding area are not engaging in sufficient hand cleaning activity. The barcode could also be used for a number of other purposes, such as initiating an order from the manufacturer for additional reservoirs, or commencing a timer that notifies the customer when the liquid within the dispenser will expire.

Some alternate embodiments of the invention use tags or markers that are read by non-optical means. For example, in some embodiments the reservoir and the housing are each provided with a radio-frequency identification (RFID) tag positioned so that, when the reservoir is received by the housing, the two RFID tags are simultaneously readable by a compatible device, such as a handheld RFID reader. The RFID tags preferably contain data that provides certain information or performs a particular function only when the two tags are read simultaneously. For example, the RFID tag on the housing may direct the RFID reader to open a particular web address, and the RFID tag on the reservoir may provide data that is submitted to the web address. In other embodiments, one RFID tag may contain encrypted data, and the other RFID tag may contain a key for decoding the data. As in the previously described embodiments, the simultaneous reading of the two tags can be used for any number of purposes, such as tracking usage or providing discounts to customers.

Accordingly, in one aspect, the present invention resides in a dispenser comprising:

a replaceable cartridge containing a product to be dispensed, the cartridge having a cartridge surface that is marked with a first marking; and a housing configured to removably receive the cartridge, the housing having a housing surface that is marked with a second marking;

wherein the housing is configured so that, when the cartridge is received by the housing, the first marking and the second marking together form a machine readable code.

Preferably, the machine readable code is detectable from outside of the housing. In some embodiments, the housing surface comprises a light-permeable window that is configured so that, when the cartridge is received by the housing, at least part of the first marking is optically detectable through the light-permeable window. The light-permeable window may comprise an opening in the housing surface and/or a transparent wall or panel.

In some embodiments, the machine readable code comprises a barcode; wherein the first marking comprises a first part of the barcode; and wherein the second marking comprises a second part of the barcode. The barcode may comprise a two-dimensional barcode, such as a QR code.

The machine readable code may contain data that identifies the cartridge and the housing and/or that uniquely identifies the combination of the cartridge and the housing.

In some embodiments of the invention, the first marking comprises a first barcode; the second marking comprises a second barcode; and the machine readable code comprises a third barcode that differs from the first barcode and the second barcode. The first barcode may contain data that identifies the cartridge; the second barcode may contain data that identifies the housing; and the third barcode may contain data that identifies the cartridge and the housing.

Optionally, the product to be dispensed may be a hand cleaning liquid.

The dispenser may further comprise a coupling mechanism that is configured to engage with the cartridge to fixedly locate the cartridge relative the housing that the first marking and the second marking are juxtaposed relative each other to form the machine readable barcode, preferably, so as to locate the cartridge inside the housing, with the cartridge surface closely juxtaposed to the transparent wall or panel. Preferably, when the cartridge is received by the housing, the cartridge surface is positioned within 10 mm of the transparent wall or panel. In some embodiments, when the cartridge is received by the housing, the cartridge surface contacts the transparent wall or panel.

The cartridge may comprise a reservoir containing the hand cleaning liquid, with the first marking be displayed on a wall of the reservoir. In other embodiments, the cartridge comprises: a reservoir containing the hand cleaning liquid; a pump connected to the reservoir for discharging the hand cleaning liquid therefrom; and a collar connected to the pump, the collar comprising a collar surface; wherein the first marking is displayed on the collar surface.

In another aspect, the present invention resides in a method of use of a dispenser, the dispenser comprising a housing configured to removably receive a replaceable cartridge containing a product to be dispensed, the method comprising:

generating a machine readable code;

marking the cartridge with a first marking, the first marking comprising a first part of the machine readable code; and marking the housing with a second marking, the second marking comprising a second part of the machine readable code;

wherein the first marking and the second marking are positioned so that, when the cartridge is received by the housing, the first marking and the second marking together form the machine readable code.

In some embodiments, marking the housing comprises marking the second marking on or adjacent to a light-permeable window of the housing; and marking the cartridge comprises marking the first marking on a surface of the cartridge that, when the cartridge is received by the housing, is positioned behind the light-permeable window, so that the first part of the machine readable code is detectable through the light-permeable window.

The method may further comprise: placing the cartridge within the housing; and reading the machine readable code with a compatible device. Preferably, the machine readable code is read by the compatible device shortly after the cartridge is placed within the housing, such as within 1 hour.

The method may further comprise transmitting data read from the machine readable code to a server.

In some embodiments, generating the machine readable code comprises encoding, within the machine readable code, a housing identifier that uniquely identifies the housing; and transmitting the data read from the machine readable code comprises transmitting the housing identifier to the server.

The method may further comprise: recording a location of the housing; associating the location of the housing with the housing identifier; and using the housing identifier to associate the data transmitted to the server with the location of the housing.

In some embodiments, generating the machine readable code comprises encoding, within the machine readable code, information indicating that the cartridge is received in the housing; encoding, within the machine readable code, a housing identifier that uniquely identifies the housing, and a cartridge identifier that uniquely identifies the cartridge; encoding, within the machine readable code, information that uniquely identifies the combination of the housing and the cartridge; and/or encoding a discount code within the machine readable code. The method may further comprise using the discount code to provide a credit to a purchaser of the cartridge or the housing.

Generating the machine readable code may also comprise encoding a Uniform Resource Locator (URL) within the machine readable code.

In some embodiments, generating the machine readable code comprises encoding, within the machine readable code, a housing identifier that uniquely identifies the housing, and a cartridge identifier that uniquely identifies the cartridge; and transmitting data read from the machine readable code comprises transmitting the housing identifier and the cartridge identifier to the server.

The method may further comprise transmitting a date that the machine readable code is read by the compatible device to the server and/or transmitting an account identifier associated with the compatible device to the server.

Generating the machine readable code may comprise encoding, within the machine readable code, data that, when read by the compatible device, instructs the device to initiate an order from a supplier.

In some embodiments, generating the machine readable code comprises encoding, within the machine readable code, data that represents a storage life of the product; and the method further comprises initiating, after the machine readable code is read by the compatible device, a timer that reflects the storage life of the product.

The method may further comprise transmitting data read from the machine readable code to a usage tracking system and/or transmitting data read from the machine readable code to a supplier discount system.

In some preferred embodiments, the replaceable cartridge is a first replaceable cartridge and the machine readable code is a first machine readable code, and the method further comprises:

providing a second replaceable cartridge containing the product to be dispensed, the second cartridge configured to be removably received by the housing;

generating a second machine readable code having a first part and a second part, wherein the first part of the second machine readable code differs from the first part of the first machine readable code, and the second part of the second machine readable code is identical to the second part of the first machine readable code; and marking the second cartridge with a third marking, the third marking comprising the first part of the second machine readable code;

wherein the third marking and the second marking are positioned so that, when the second cartridge is received by the housing, the third marking and the second marking together form the second machine readable code.

Generating the first machine readable code may comprise encoding, within the first machine readable code, information that uniquely identifies the combination of the housing and the first cartridge; and generating the second machine readable code may comprise encoding, within the second machine readable code, information that uniquely identifies the combination of the housing and the second cartridge.

The method may further comprise: placing the first cartridge within the housing; reading the first machine readable code with a compatible device; transmitting data read from the first machine readable code to a usage tracking system; dispensing the product contained in the first cartridge from the dispenser; removing the first cartridge from the housing; placing the second cartridge within the housing; reading the second machine readable code with the compatible device; and transmitting data read from the second machine readable code to the usage tracking system.

In a further aspect, the present invention resides in a method comprising:

providing a plurality of dispensers and a plurality of replaceable cartridges containing a product to be dispensed, wherein each of the plurality of dispensers is configured to removably receive at least a subset of the plurality of replaceable cartridges;

marking each of the plurality of replaceable cartridges with a unique first marking; and marking each of the plurality of dispensers with a unique second marking;

wherein the unique first marking and the unique second marking are configured so that, when one of the plurality of replaceable cartridges is received by one of the plurality of dispensers, the unique first marking and the unique second marking together form a unique machine readable code, wherein the unique machine readable code contains information that uniquely identifies the combination of the one of the plurality of replaceable cartridges and the one of the plurality of dispensers that are combined to form the unique machine readable code.

In a still further aspect, the present invention resides in a dispenser comprising:

a replaceable cartridge containing a product to be dispensed, the cartridge comprising a first machine readable tag; and a housing configured to removably receive the cartridge, the housing comprising a second machine readable tag;

wherein the housing is configured so that, when the cartridge is received by the housing, the first machine readable tag and the second machine readable tag are positioned relative to one another so as to be simultaneously readable by a compatible device.

In some embodiments, the first machine readable tag comprises a first RFID tag, and the second machine readable tag comprises a second RFID tag. In other embodiments, the first machine readable tag comprises a first barcode, and the second machine readable tag comprises a second barcode. The first barcode may comprise a first QR code, and the second barcode may comprise a second QR code.

The first machine readable tag may contain encrypted data, and the second machine readable tag may contain a key for decoding the encrypted data.

In some embodiments, the first machine readable tag and the second machine readable tag contain data that causes the compatible device to perform an action only when the first machine readable tag and the second machine readable tag are read simultaneously by the device.

The cartridge may comprise: a reservoir containing hand cleaning liquid; and a pump connected to the reservoir for discharging the hand cleaning liquid therefrom.

In another aspect, the present invention resides in a method of use of a dispenser, the dispenser comprising a housing configured to removably receive a replaceable cartridge containing a product to be dispensed, the method comprising:

placing a first machine readable tag on the cartridge; and placing a second machine readable tag on the housing;

wherein the first machine readable tag and the second machine readable tag are positioned relative to one another so as to be simultaneously readable by a compatible device when the cartridge is received by the housing.

In some embodiments, the first machine readable tag comprises a first RFID tag, and the second machine readable tag comprises a second RFID tag; and placing the first machine readable tag comprises placing the first RFID tag at a position on the cartridge where the first RFID tag is readable by the compatible device, from outside of the housing, when the cartridge is received by the housing.

In other embodiments, the first machine readable tag comprises a first barcode, and the second machine readable tag comprises a second barcode; and placing the first machine readable tag comprises placing the first barcode at a position on the cartridge where the first barcode is visible, from outside of the housing, when the cartridge is received by the housing.

The method may further comprise: encoding encrypted data in the first machine readable tag; and encoding a key for decoding the encrypted data in the second machine readable tag. The method may also comprise encoding, within the first machine readable tag and the second machine readable tag, data that causes the compatible device to perform an action only when the first machine readable tag and the second machine readable tag are read simultaneously by the device.

In some preferred embodiments, the method further comprises: placing the cartridge within the housing; and simultaneously reading the first machine readable tag and the second machine readable tag with the device. Preferably, the first machine readable tag and the second machine readable tag are read simultaneously by the device shortly after the cartridge is placed within the housing, such as within 1 hour.

The method may further comprise transmitting data read from the first machine readable tag and the second machine readable tag to a server.

In some embodiments, the method further comprises encoding, within the second machine readable tag, a housing identifier that uniquely identifies the housing; and transmitting the data read from the first machine readable tag and the second machine readable tag comprises transmitting the housing identifier to the server.

The method may further comprise: recording a location of the housing; associating the location of the housing with the housing identifier; and using the housing identifier to associate the data transmitted to the server with the location of the housing.

In some embodiments, the method further comprises: placing the cartridge within the housing; and simultaneously reading the first machine readable tag and the second machine readable tag with the device, so as to cause the device to perform the action. The action may comprise transmitting or recording information indicating that the cartridge is received in the housing.

The method may further comprise: encoding, within the first machine readable tag, a cartridge identifier that uniquely identifies the cartridge; and encoding, within the second machine readable tag, a housing identifier that uniquely identifies the housing.

In some embodiments, the method further comprises: encoding, within the first machine readable tag, a cartridge identifier that uniquely identifies the cartridge; and encoding, within the second machine readable tag, a housing identifier that uniquely identifies the housing; wherein the action comprises transmitting or recording the cartridge identifier and the housing identifier. In some embodiments, the action comprises displaying a discount code. The method may further comprise using the discount code to provide a credit to a purchaser of the cartridge or the housing.

In some embodiments, the action may comprise opening a Uniform Resource Locator (URL); transmitting or recording a date that the first machine readable tag and the second machine readable tag are read simultaneously by the device; transmitting an account identifier associated with the compatible device; initiating an order from a supplier; starting a timer that reflects a storage life of the product; transmitting information to a usage tracking system; and/or transmitting information to a supplier discount system.

In some preferred embodiments, the replaceable cartridge is a first replaceable cartridge, and the method further comprises:
providing a second replaceable cartridge containing the product to be dispensed, the second cartridge configured to be removably received by the housing; and
placing a third machine readable tag on the second replaceable cartridge;
wherein the third machine readable tag and the second machine readable tag are positioned relative to one another so as to be simultaneously readable by the compatible device when the second cartridge is received by the housing.

The method may further comprise: encoding, within the first machine readable tag, a first cartridge identifier that uniquely identifies the first cartridge; encoding, within the second machine readable tag, a housing identifier that uniquely identifies the housing; and encoding, within the third machine readable tag, a second cartridge identifier that uniquely identifies the second cartridge.

The method may additionally comprise: placing the first cartridge within the housing; simultaneously reading the first machine readable tag and the second machine readable tag with the compatible device; recording or transmitting the first cartridge identifier and the housing identifier; dispensing the product contained in the first cartridge from the dispenser; removing the first cartridge from the housing; placing the second cartridge within the housing; simultaneously reading the third machine readable tag and the second machine readable tag with the compatible device; and recording or transmitting the second cartridge identifier and the housing identifier.

In a still further aspect, the present invention resides in a method comprising:
providing a plurality of dispensers and a plurality of replaceable cartridges containing a product to be dispensed, wherein each of the plurality of dispensers is configured to removably receive at least a subset of the plurality of replaceable cartridges;
placing a unique machine readable cartridge tag on each of the plurality of replaceable cartridges; and
placing a unique machine readable dispenser tag on each of the plurality of dispensers;
wherein, when one of the plurality of replaceable cartridges is received by one of the plurality of dispensers to form a unique combination, the unique machine readable cartridge tag and the unique machine readable dispenser tag are positioned relative to one another so as to be simultaneously readable by a compatible device; and
wherein the unique machine readable cartridge tag and the unique machine readable dispenser tag contain data that, when read simultaneously by the compatible device, causes the device to record or transmit information that uniquely identifies the one of the plurality of replaceable cartridges and the one of the plurality of dispensers forming the unique combination.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Reference is made first to FIGS. 1 to 7, which show a liquid dispenser 10 in accordance with a first preferred embodiment of the invention. The liquid dispenser 10 dispenses hand cleaning products such as soap or hand sanitizer, and has a reusable housing 12 that contains a replaceable reservoir cartridge 14.

Figure 3:
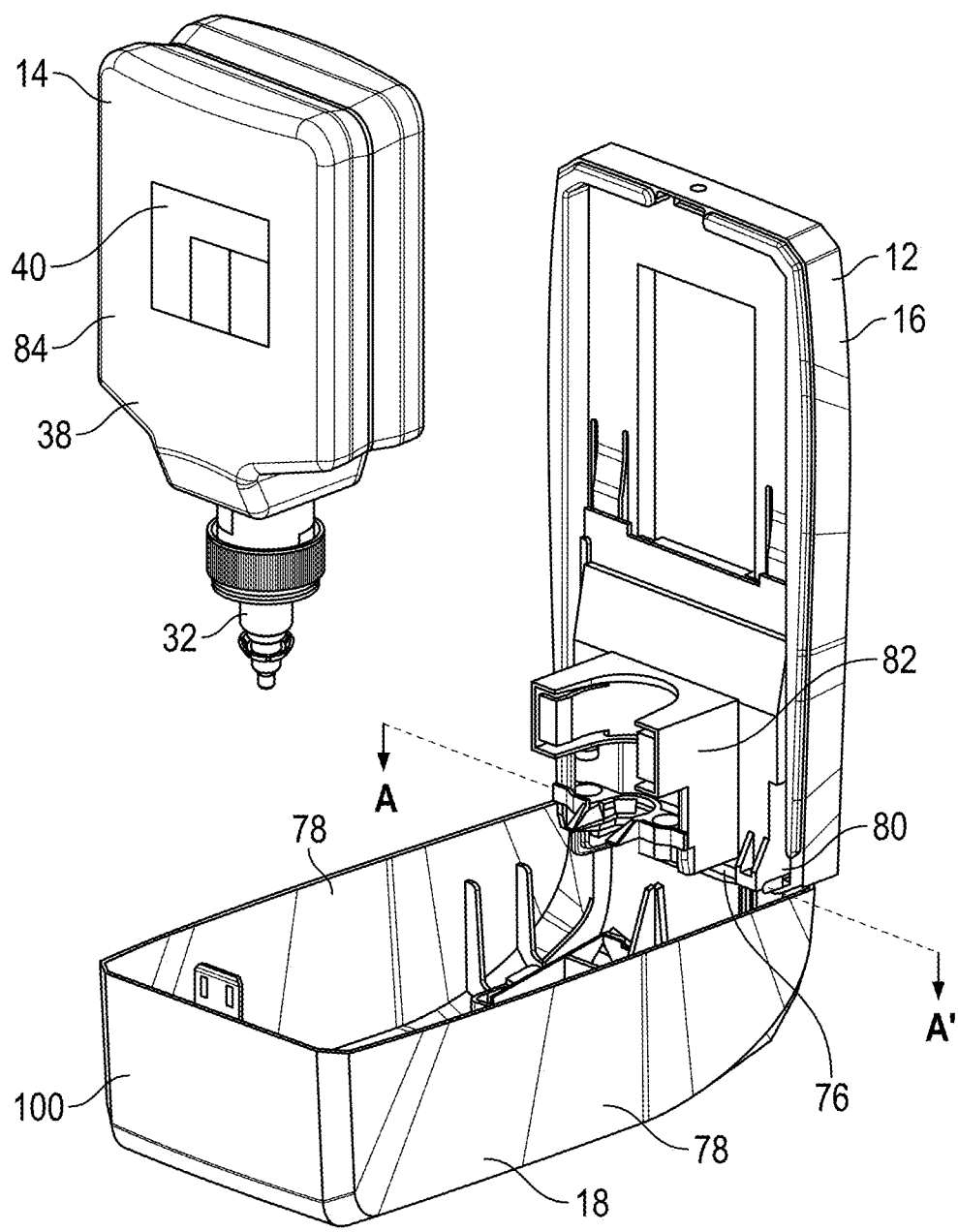
FIG. 3 shows a perspective view of the liquid dispenser shown in FIG. 1, with a front cover of the housing shown in an open condition, and the replaceable reservoir spaced from the housing.

The housing 12 includes a back panel 16 for mounting the housing 12 to a wall or similar support structure, as well as a hinged front cover 18. The hinged front cover 18 has a top 100 and two side walls 78. As can be seen in FIG. 3, a rod 76 extends along axis A-A' between side walls 78. The rod 76 passes through a flange 80 of the back panel 16, permitting the front cover 18 to pivot about axis A-A' between an open position and a closed position. The housing 12 also includes a bottle support member 82, which is configured to engage with a pump assembly 32 of the cartridge 14 to fixedly locate the cartridge 14 within the housing 12.

Figure 2:
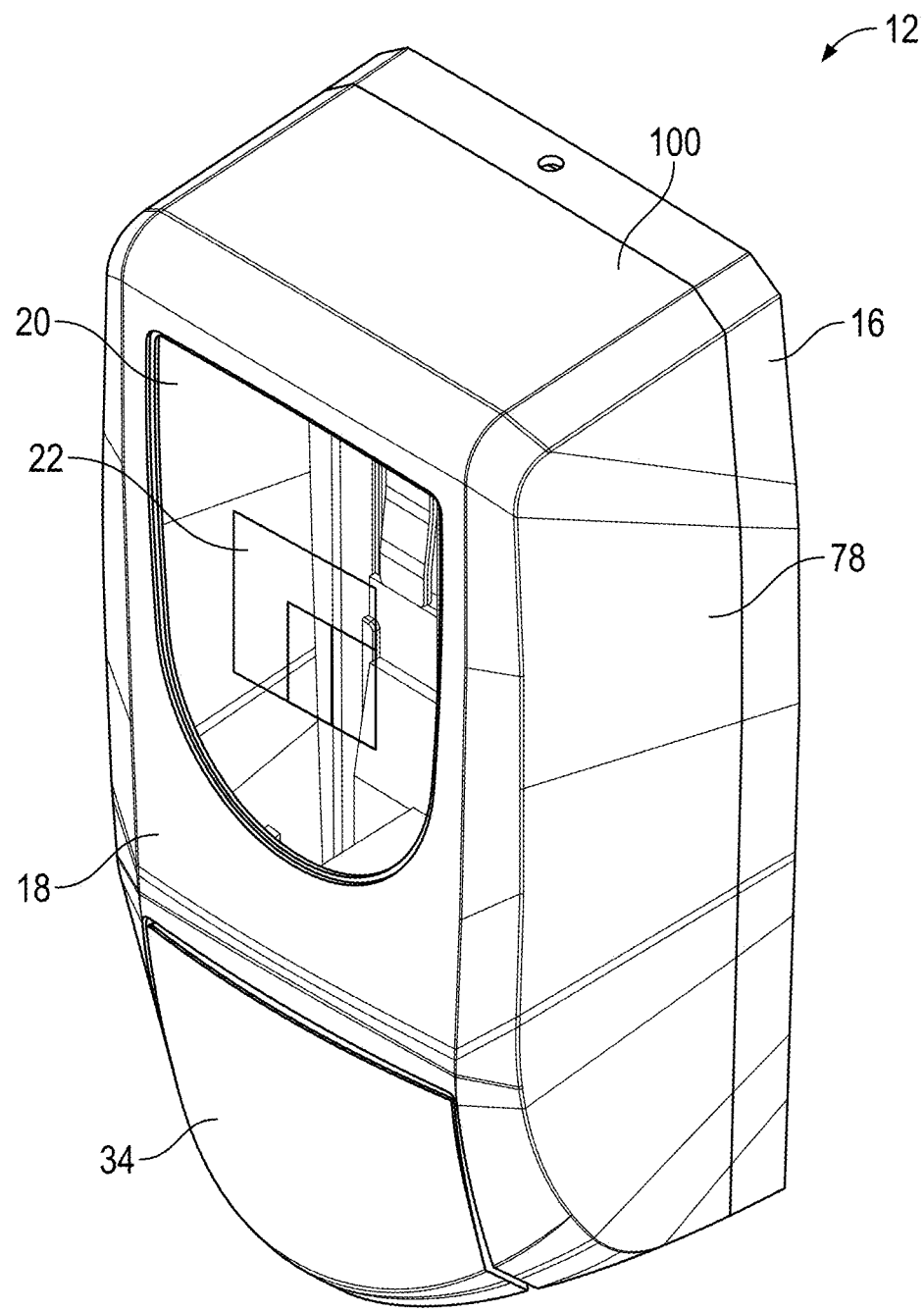
FIG. 2 shows a perspective view of the liquid dispenser shown in FIG. 1, with the replaceable reservoir removed.
Figure 4:
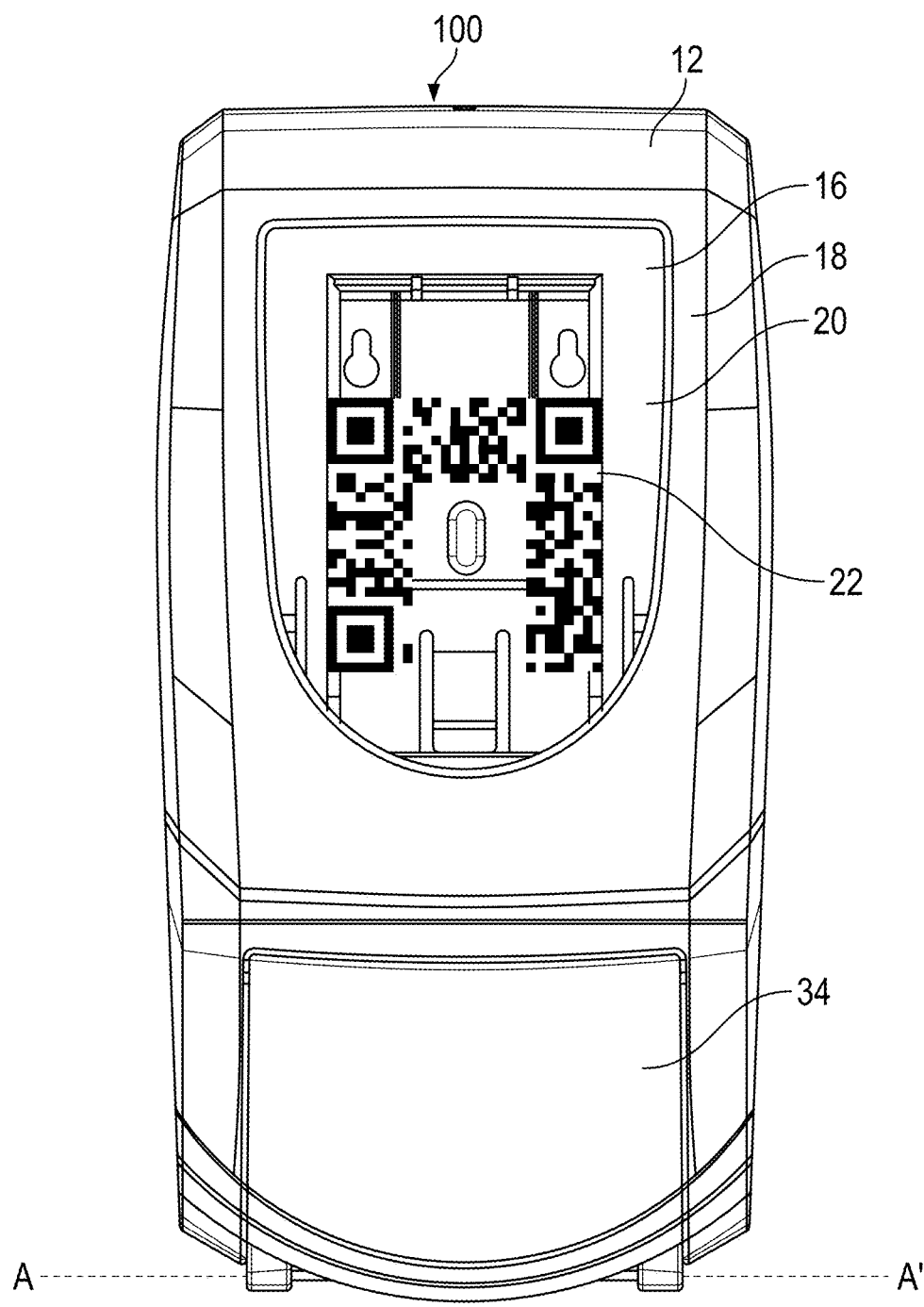
FIG. 4 shows a front view of the liquid dispenser shown in FIG. 1, with the replaceable reservoir removed.
Figure 5:
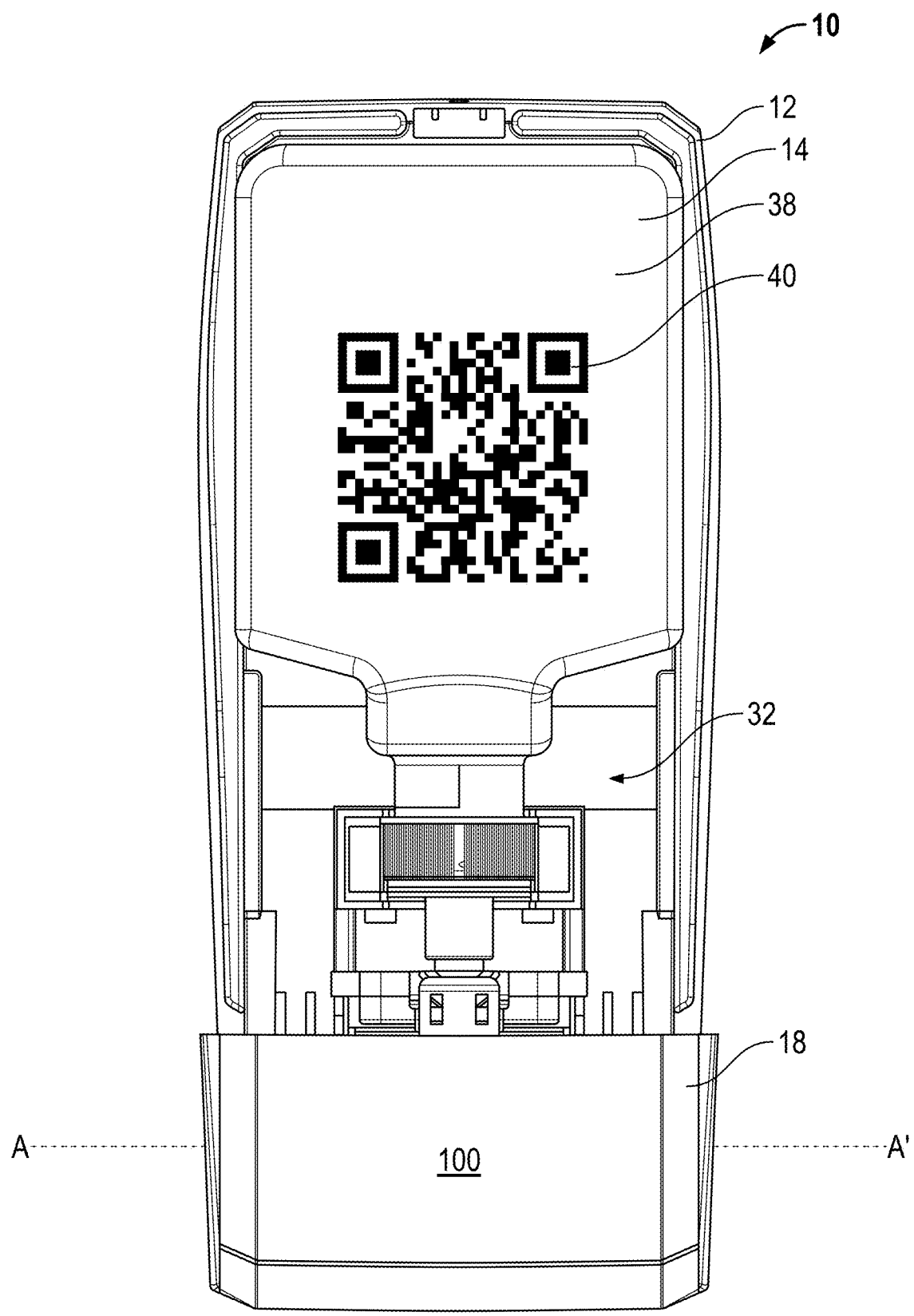
FIG. 5 shows a front view of the liquid dispenser shown in FIG. 1, with the front cover of the housing shown in the open condition.

The front cover 18 includes a transparent window 20, which permits visual inspection of the contents of the housing 12. As is best shown in FIGS. 2 and 4, a housing quick response (QR) code 22 is displayed on the transparent window 20. For ease of illustration, the QR code 22 is shown as a schematic representation the same as in FIG. 8 rather than as an exemplary QR code 22 as in FIGS. 4 and 9.

As best shown in FIG. 3, the reservoir cartridge 14 comprises a plastic container or bottle 84 which is coupled to a pump assembly 32. The bottle 84 contains the liquid 30 to be dispensed by the dispenser 10, and has a front facing surface 38 which displays a bottle QR code 40. For ease of illustration, the QR code 40 is shown as a schematic representation the same as in FIG. 8 rather than as an exemplary QR code 40 as in FIGS. 5 and 10. The pump assembly 32 is configured to couple with the bottle support member 82, and to discharge the liquid 30 contained within the bottle 84 when activated.

When mounted in place within the housing 12, with the pump assembly 32 received by the bottle support member 82, the pump assembly 32 is operatively connected to an actuator 34. When the actuator 34 is depressed, the pump assembly 32 is activated to discharge an allotment of the liquid 30 from the cartridge 14. The discharged liquid 30 may, for example, be used to clean or sanitize a user's hand 36.

Any suitable construction of the housing 12 and the cartridge 14, including any number of different configurations of the pump assembly 32, bottle support member 82 and actuator 34 could be used with the present invention, including for example those described in U.S. Pat. No. 7,984,825 to Ophardt et al., issued Jul. 26, 2011; U.S. Pat. No. 8,684,236 to Ophardt, issued Apr. 1, 2014; U.S. Pat. No. 5,373,970 to Ophardt, issued Dec. 20, 1994; U.S. Pat. No. 5,836,482 to Ophardt et al., issued Nov. 17, 1998; U.S. Pat. No. 8,113,388 to Ophardt et al., issued Feb. 14, 2012; and U.S. Patent Application Publication No. 2015/0190827 to Ophardt et al., published Jul. 9, 2015, which are incorporated herein by reference.

Figure 1:
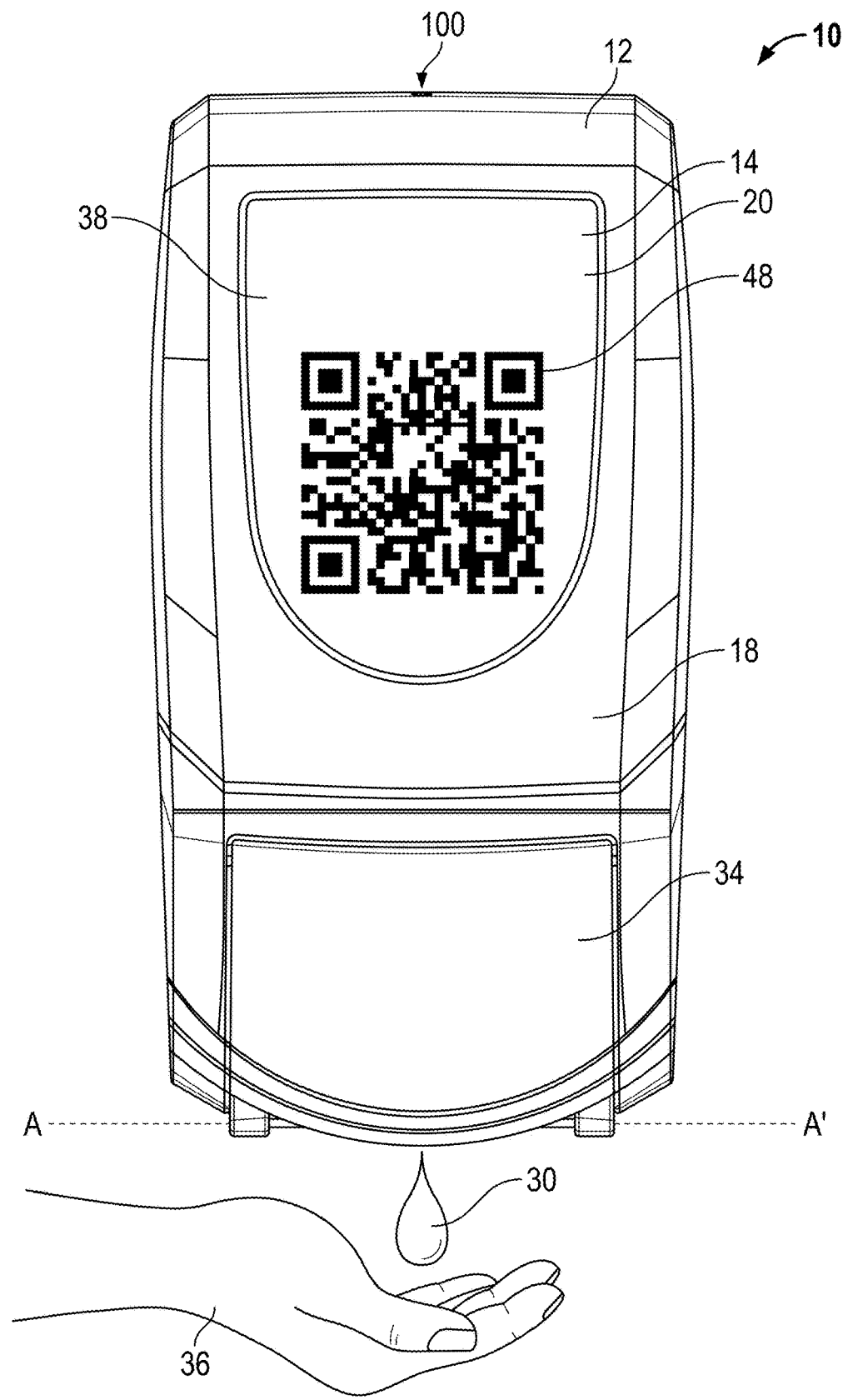
FIG. 1 shows a front view of a liquid dispenser in accordance with a first preferred embodiment of the invention, with a replaceable reservoir contained within a housing of the dispenser.
Figure 6:
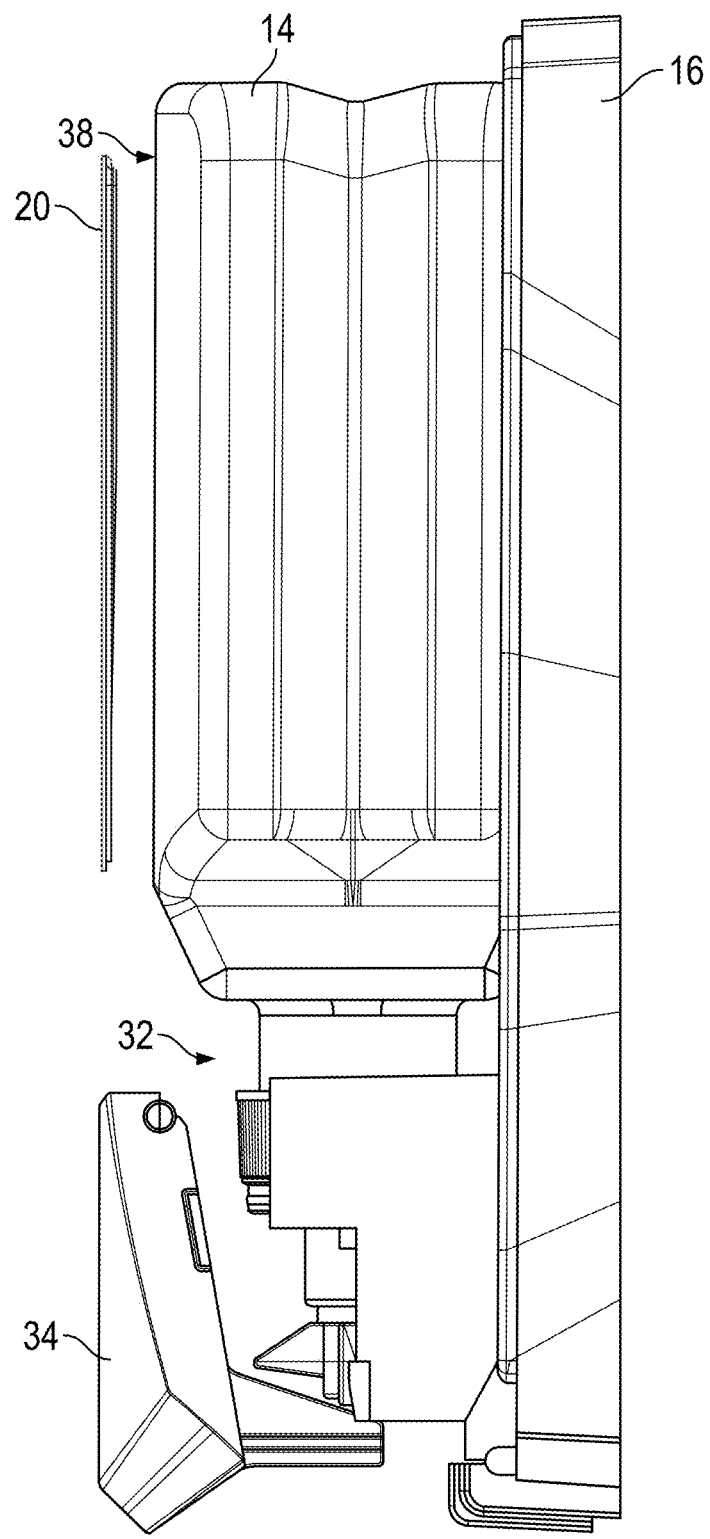
FIG. 6 shows a side view of the liquid dispenser shown in FIG. 1, with the front cover removed to show the relative positioning of the replaceable reservoir and a transparent window of the housing.
Figure 7:
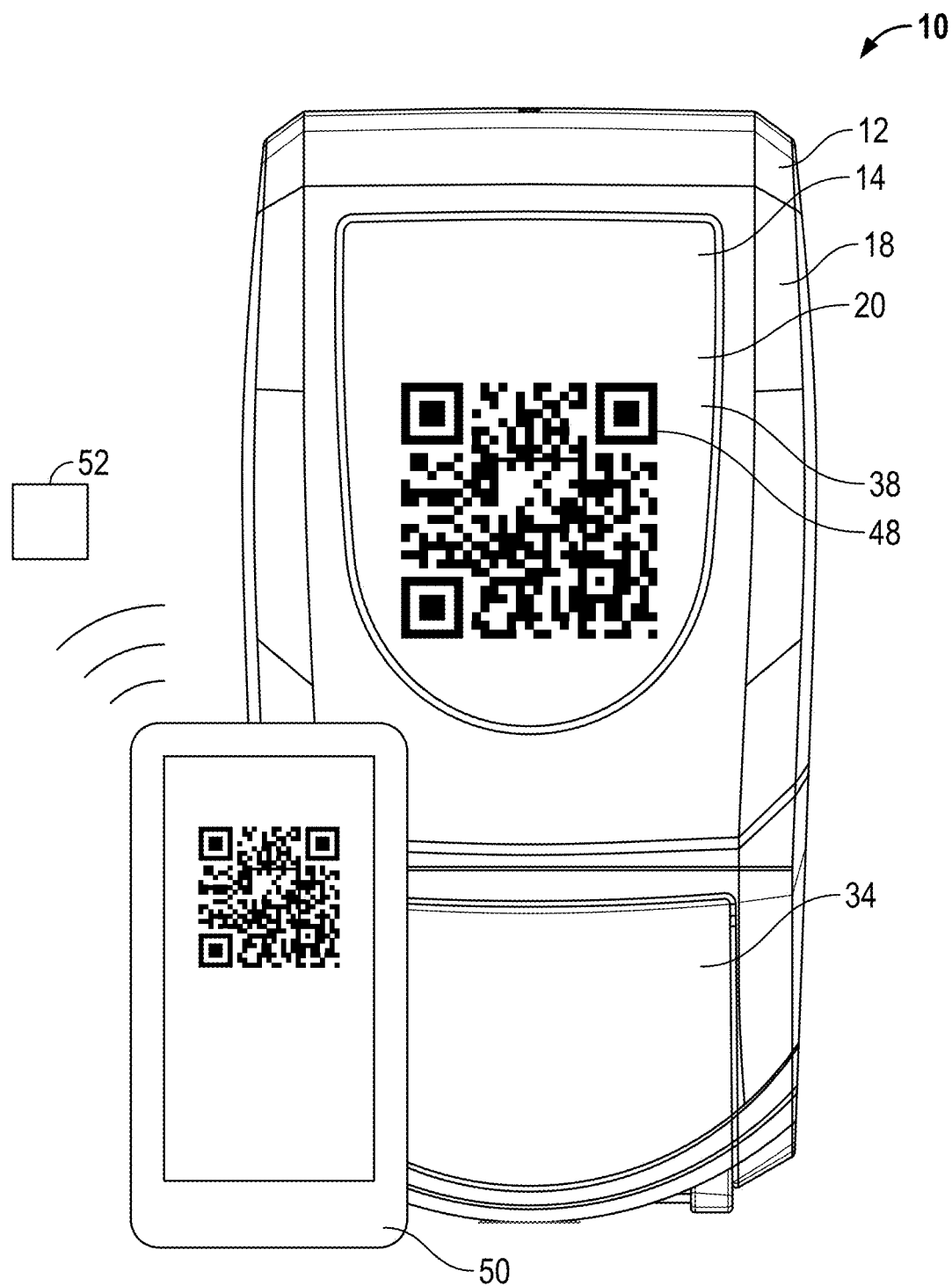
FIG. 7 shows a front view of the liquid dispenser shown in FIG. 1, with a smartphone shown reading a QR code on the dispenser.
Figure 11:
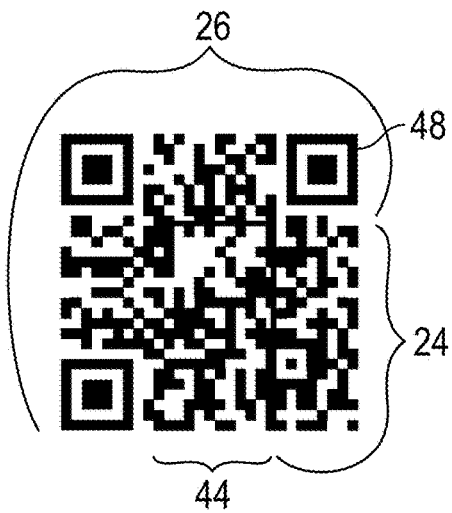
FIG. 11 shows a combined QR code that is formed by superimposing the QR code of FIG. 9 over the QR code of FIG. 10, as occurs when the replaceable reservoir is contained within the housing of the liquid dispenser shown in FIG. 1.

The liquid dispenser 10 is configured so that, when the cartridge 14 is mounted within the housing 12, and the front cover 18 is moved to the closed position, the housing QR code 22 is superimposed over the bottle QR code 40, so as to form a combined QR code 48, as shown in FIGS. 1, 7 and 11. In order for the combined QR code 48 to be machine readable, the housing QR code 22 and the bottle QR code 40 need to be properly aligned and closely juxtaposed. This is achieved by configuring and sizing the cartridge 14 so that the cartridge surface 38 sits closely behind the transparent window 20 when the cartridge 14 is received by the housing 12, as is best shown in FIG. 6. Preferably, the cartridge surface 38 is positioned within 10 mm of the transparent window 20. In some embodiments, the cartridge surface 38 may be configured to contact the window 20, to bring the housing QR code 22 and the bottle QR code 40 as close together as possible. The bottle support member 82 is furthermore configured to hold the pump assembly 32 in a precise, fixed position, to ensure that the housing QR code 22 and the bottle QR code 40 are properly aligned.

Figure 8:
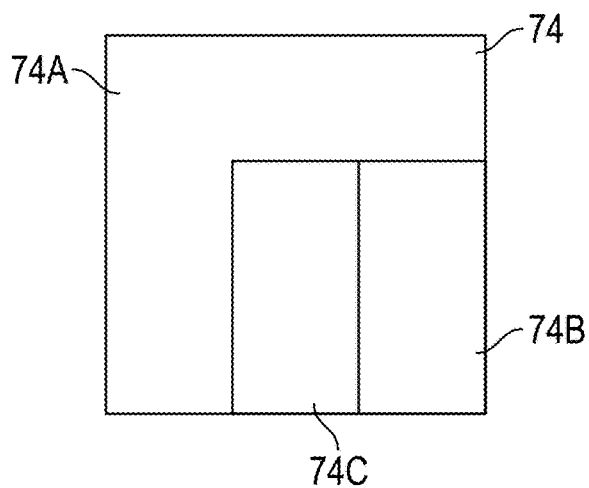
FIG. 8 shows a schematic representation of a QR code.

To illustrate how the housing QR code 22, the bottle QR code 40 and the combined QR code 48 may function, reference is first made to the schematic representation of an exemplary QR code 74 that is shown in FIG. 8. The QR code 74 is divided into a number of different coding regions 74A, 74B, and 74C, with each coding region 74A, 74B, and 74C encoding a distinct set of information. For example, a first coding region 74A could encode the address of a particular web domain, such as www.example.com. A second coding region 74B could further specify a directory of the parent domain, such as /directory; and a third coding region 74C could specify a subdirectory, such as /subdirectory. When the entire QR code 74 is read by a compatible device, the code 74 would direct the device to open the web address www.example.com/directory/subdirectory.

Because the QR code 74 is divided into distinct coding regions 74A, 74B and 74C, it is possible to read the code 74 even when the second coding region 74B and/or the third coding region 74C are missing. For example, if the third coding region 74C is omitted, the first and second coding regions 74A and 74B can still be read to direct the device to the web address www.example.com/directory. If both the second region 74B and the third region 74C are omitted, reading the first coding region 74A of QR code 74 directs the device to the web address www.example.com.

Another consequence of dividing the QR code 74 into distinct coding regions 74A, 74B and 74C is that the data contained in one coding region 74C can be changed without affecting the data contained in the other coding regions 74A and 74B. This permits the coding regions 74A, 74B and 74C of different QR codes 74 to be mixed and matched, creating new QR codes 74 that remain machine readable, with the information contained in each coding region 74A, 74B and 74C still intact.

Figure 9:
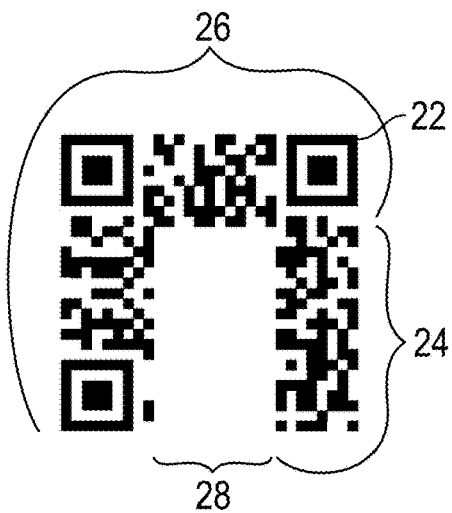
FIG. 9 shows a QR code from the housing of the liquid dispenser shown in FIG. 4.

In the embodiment of the invention shown in FIGS. 1 to 7, the housing QR code 22 and the bottle QR code 40 are similarly divided into a number of distinct regions. In particular, the housing QR code 22 is shown in FIG. 9 as including a housing data region 24, a conserved region 26, and an unused region 28. The unused region 28 is free of markings, such that the space immediately behind the unused region 28 is visible through the transparent window 20.

Figure 10:
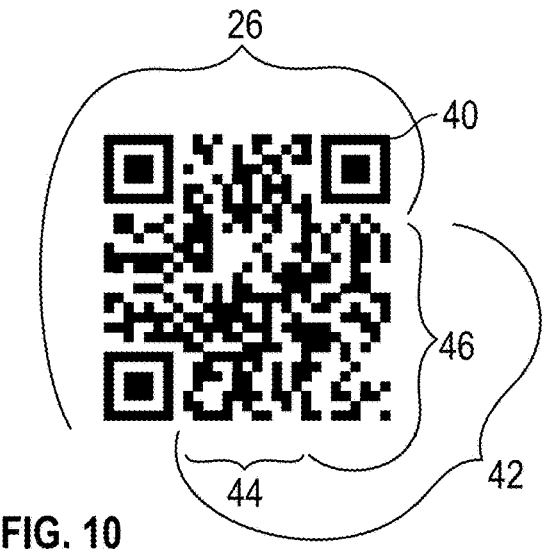
FIG. 10 shows a QR code from the replaceable reservoir of the liquid dispenser shown in FIG. 5.

The bottle QR code 40 is shown in FIG. 10 as including a bottle data region 42 and a conserved region 26. The conserved region 26 in the bottle QR code 40 corresponds identically to the conserved region 26 in the housing QR code 22. The bottle data region 42 differs from the housing data region 24 and the unused region 28 of the housing QR code 22, and includes an insertable region 44 and a non-insertable region 46.

When the housing QR code 22 is superimposed over the bottle QR code 40, as occurs when the cartridge 14 is contained within the housing 12, a combined QR code 48 is formed as illustrated in FIG. 11. The combined QR code 48 includes the housing data region 24 and the conserved region 26 of the housing QR code 22, as these coding regions are displayed on the transparent window 20 and thus remain visible when the cartridge 14 is received by the housing 12. The conserved region 26 and the non-insertable region 46 of the bottle QR code 40 are hidden behind the housing data region 24 and the conserved region 26 of the housing QR code 22, and thus do not form part of the combined QR code 48. The insertable region 44 of the bottle QR code 40, however, remains visible through the transparent window 20 under the unused region 28, and thus is included in the combined QR code 48. As described above, the cartridge 14 and the transparent window 20 must be precisely aligned to ensure that the insertable region 44 of the bottle QR code 40 sits immediately behind the unused region 28 of the housing QR code 22, to ensure that the combined QR code 48 is properly formed and machine readable. The combined QR code 48 may be read by any suitable device, such as a smartphone 50 having a camera and QR code reading software, as shown in FIG. 7.

The combined QR code 48 may be used for a number of different purposes which take advantage of the fact that the code 48 only appears when the reservoir cartridge 14 is mounted within the housing 12. For example, the combined QR code 48 could contain data that represents a discount code for obtaining a discount or rebate from the manufacturer of the dispenser 10. This could be achieved, for example, by including a portion of the discount code within the housing data region 24 of the housing QR code 22, and a portion of the discount code within the insertable region 44 of the bottle QR code 40, such that the entire discount code can only be read from the combined QR code 48, which includes both regions 24 and 44.

The discount code could be used as an incentive for customers to buy replacement cartridges 14 from the original manufacturer of the dispenser 10. For example, each combination of a housing 12 and a cartridge 14 could produce a different combined QR code 48 containing a different discount code, allowing customers to accumulate discounts over time by purchasing replacement cartridges 14 from the original manufacturer. These discounts could be used, for example, to offset the original purchase price of the dispenser 10.

The combined QR code 48 could also contain data that, when read by a compatible device, instructs the device to access or transmit information to a server 52 operated by the manufacturer of the dispenser 10. For example, the conserved region 26 could contain data that, when read by a smartphone 50, directs the smartphone 50 to open a web domain, such as www.example.com. Each of the housing data region 24, the insertable region 44, and the non-insertable region 46 could furthermore contain data which directs the smartphone 50 to a directory or subdirectory of the parent domain. For example, the housing QR code 22 could direct the smartphone 50 to the web address www.example.com/housing123, with the conserved region 26 specifying the domain www.example.com, and the housing data region 24 specifying the directory/housing123. Preferably, this directory is uniquely associated with a single housing 12, and thus distinguishes the housing 12 from all other housings 12 that have been produced by the manufacturer. The directory could provide information such as a description of the housing's 12 features, or a downloadable owner's manual. It could also display the purchase and refill history of the housing 12, or other account specific information. If account specific information is displayed, the directory could be password protected, or only accessible by devices that have been registered as associated with the customer's account.

The bottle QR code 40 could likewise direct the smartphone 50 to the web address www.example.com/bottleinfo/bottle321, with the conserved region 26 specifying the domain www.example.com, the non-insertable region 46 specifying the directory/bottleinfo, and the insertable region 44 specifying the subdirectory/bottle321. Preferably, this subdirectory is uniquely associated with a single reservoir 14, and may provide information such as the type of liquid 30 contained therein, or the types of housings 12 with which the reservoir 14 is compatible.

The combined QR code 48 could furthermore direct the smartphone 50 to the web address www.example.com/housing123/bottle321, with the conserved region 26 specifying the domain www.example.com, the housing data region 24 specifying the directory/housing123, and the insertable region 44 specifying the subdirectory/bottle321. Preferably, this web address is uniquely associated with one particular housing 12 and one particular reservoir 14, such that accessing the web address provides an indication that the reservoir 14 has been received within the housing 12. The web address may be associated with a usage tracking system, which records information such as the date and time that the web address was accessed, the account associated with the smartphone 50 that accessed the address, and unique ID numbers associated with the housing 12 and the reservoir 14. The information collected by the usage tracking system could be used by the manufacturer for a number of purposes, such as predicting when each customer will require a new supply of cartridges 14, and identifying customers who do not appear to be refilling their dispensers 10 using the manufacturer's cartridges 14. In some embodiments of the invention, the collected information may be shared with customers, for example, for use in tracking hand cleaning compliance in a healthcare facility or the like.

The combined QR code 48 may additionally be used for any desired purpose that is usefully triggered by the placement of the reservoir 14 within the housing 12. For example, the combined QR code 48 could instruct the smartphone 50 to initiate an order from the manufacturer or an associated supplier, or could cause the smartphone 50 to initiate a timer reflecting the shelf life of the liquid 30. The combined QR code 48 could also instruct the smartphone 50 to transmit information to a supplier discount system, which could for example provide discounts to customers based on the number of refill cartridges 14 that have been used over a given time period.

In the embodiment of the invention described above, the housing QR code 22 is a machine readable code that can be read independently of the bottle QR code 40. In particular, the housing QR code 22 is preferably designed to be machine readable, despite the presence of the unused region 28, by encoding all of the data within the conserved region 26 and the housing data region 24. In some embodiments of the invention, reading the housing QR code 22 may require software that is configured to read QR codes that have an unused region 28. The bottle QR code 40 is also independently machine readable.

Figure 12:
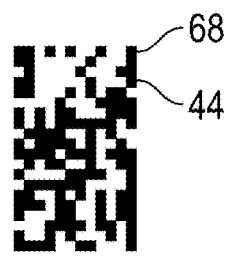
FIG. 12 shows a partial QR code which may optionally be used in place of the QR code shown in FIG. 10.

It is to be appreciated that the invention also encompasses embodiments wherein the housing 12 and/or the cartridge 14 have markings that are not independently machine readable, and only form a machine readable code when combined. For example, in the embodiment of the invention described above, the bottle QR code 40 could be replaced by the partial QR code 68 shown in FIG. 12. The partial QR code 68 includes only the insertable region 44, and is not independently readable as a QR code. When the housing QR code 22 is superimposed over the partial QR code 68, the machine readable combined QR code 48 is formed, as in the embodiment described above.

Figure 13:
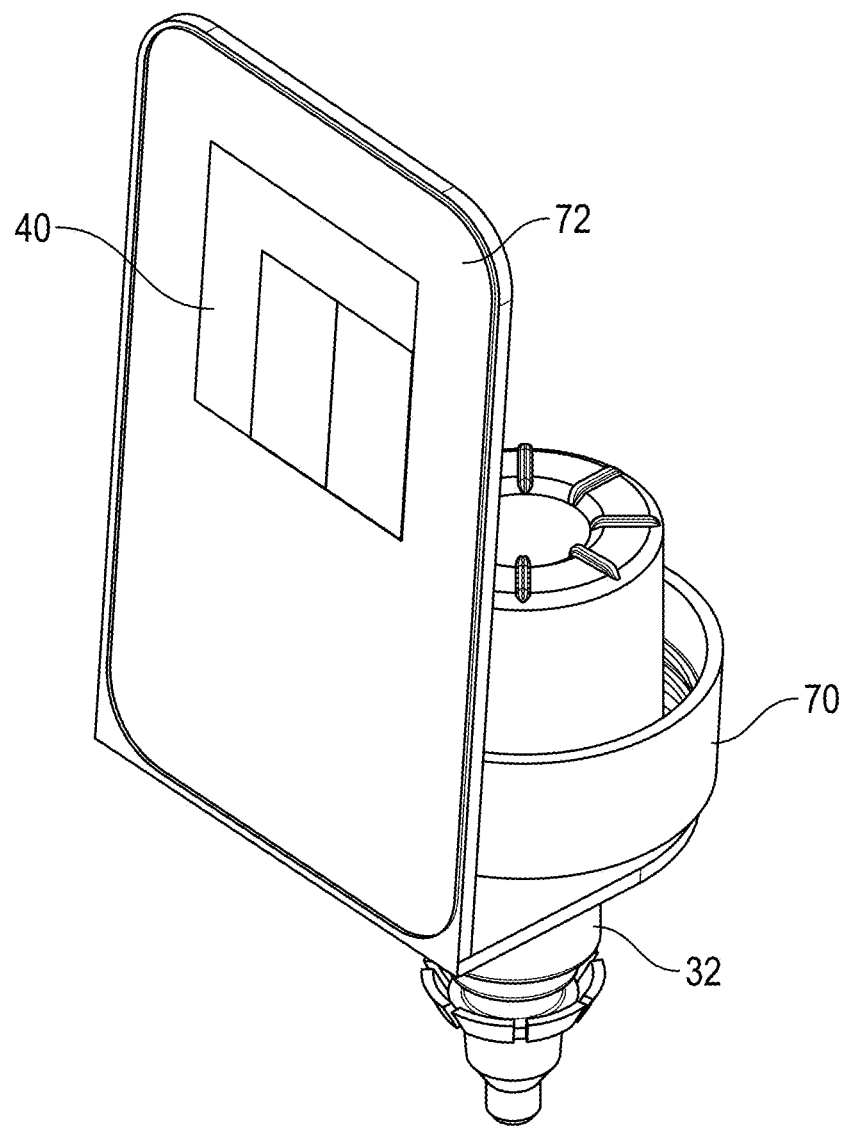
FIG. 13 shows a perspective view of a pump assembly with an attached collar, which may optionally be used in conjunction with the liquid dispenser shown in FIG. 1.

It is furthermore to be appreciated that the bottle QR code 40 could be displayed on other surfaces of the cartridge 14, and not necessarily on the front surface 38 of the reservoir 14. For example, as shown in FIG. 13, the pump assembly 32 of the cartridge 14 could incorporate a collar 70 having a vertical collar surface 72 upon which the bottle QR code 40 could be displayed. The collar surface 72 is preferably configured to sit very closely to the transparent window 20, so that the combined QR code 48 is easily read. Preferably the collar surface 72 is positioned within 10 mm of the transparent window 20, and in some embodiments may contact the window 20. Use of the collar 70 may help to establish and maintain the proper alignment of the bottle QR code 40 with the housing QR code 22. For example, in some embodiments of the invention the reservoir 84 may be configured to collapse as the liquid 30 is dispensed therefrom. By displaying the bottle QR code 40 on the collar surface 72, the alignment of the bottle QR code 40 with the housing QR code 22 can be maintained as the reservoir 84 collapses.

In some embodiments of the invention, the liquid dispenser 10 may be used as part of a method or system for tracking hand cleaning compliance. In particular, the manufacturer of the liquid dispenser 10 preferably produces a plurality of housings 12 and cartridges 14, with each housing 12 bearing a unique housing QR code 22 and each cartridge 14 bearing a unique bottle QR code 40. Each housing QR code 22 preferably contains data in the housing data region 24 that uniquely identifies the housing 12 bearing the code 22, such as a housing ID number. Each bottle QR code 40 furthermore preferably contains data in the insertable region 44 that uniquely identifies the cartridge 14 bearing the code 40, such as a cartridge ID number. With this arrangement, each combination of a housing 12 with a cartridge 14 produces a unique combined QR code 48 containing data that uniquely identifies both the housing 12 and the cartridge 14.

To track hand cleaning compliance, a user of a housing 12 loads a first cartridge 14 into the housing 12, and then reads the combined QR code 48 with a suitable device, such as a smartphone 50. The data that is read includes an identification of both the housing 12 and the first cartridge 14, and preferably the smartphone 50 also records the date that the combined QR code 48 was read. This information may be stored locally on the smartphone 50, or transmitted to a server 52 of a compliance tracking system.

The user would then use the liquid dispenser 10 until the liquid 30 contained in the first cartridge 14 was depleted. At this time, the first cartridge 14 would be removed from the housing 12, and a second cartridge 14 would be installed. The user would then read the new combined QR code 48, which would include an identification of the second cartridge 14 and the housing 12, and would record or transmit this information together with the date that the new combined QR code 48 was read. The process could then be continued for any number of additional cartridges 14.

This information can be used to provide an estimate of the amount of liquid 30 that is dispensed from the housing 12 over time. In particular, it can be estimated that the liquid 30 contained in the first cartridge 14 was used in the time period between when the first combined QR code 48 was read and when the second combined QR code 48 was read. This information may be useful, for example, in the context of a health care facility where frequent hand cleaning is required.

The combined QR code 48 is preferably read shortly after each cartridge 14 is placed within the housing 12, to ensure that the amount of time between cartridge 14 replacements is accurately determined. Preferably, the code 48 is read immediately after the cartridge 14 is placed within the housing 12, or within 1 hour thereof.

The location of each housing 12 is preferably recorded, for example, using GPS coordinates. The location can then be associated with the housing ID number uniquely identifying the housing 12, so that the location of the housing 12 can be easily determined from the data contained within the combined QR code 48. This may be useful, for example, for associating usage tracking information with particular housing 12 locations, such as in a large health care facility or the like.

Figure 14:
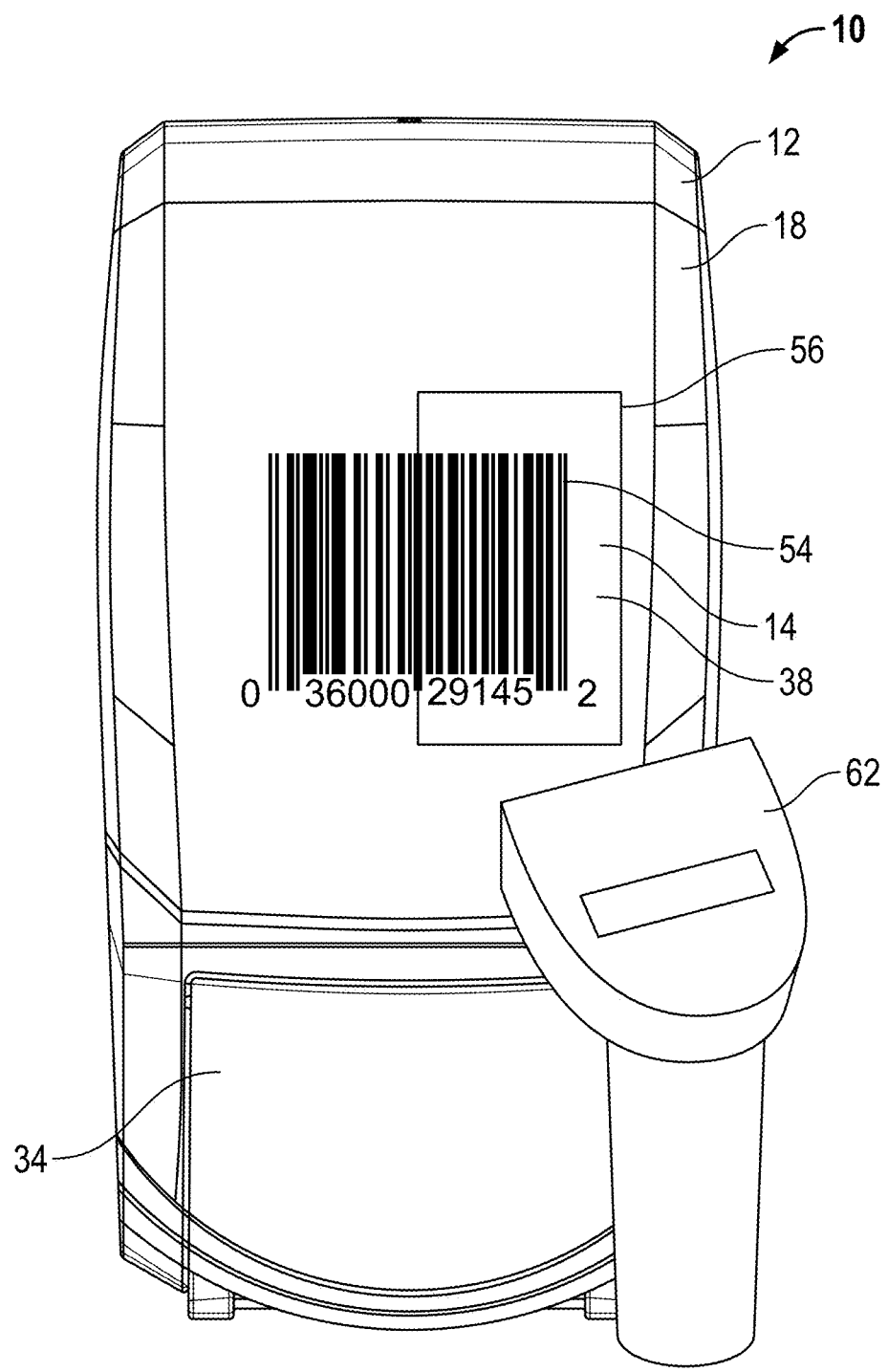
FIG. 14 shows a front view of a liquid dispenser in accordance with a second preferred embodiment of the invention, with a replaceable reservoir contained within a housing of the dispenser, and showing a handheld barcode scanner reading a UPC code on the dispenser.
Figure 15:
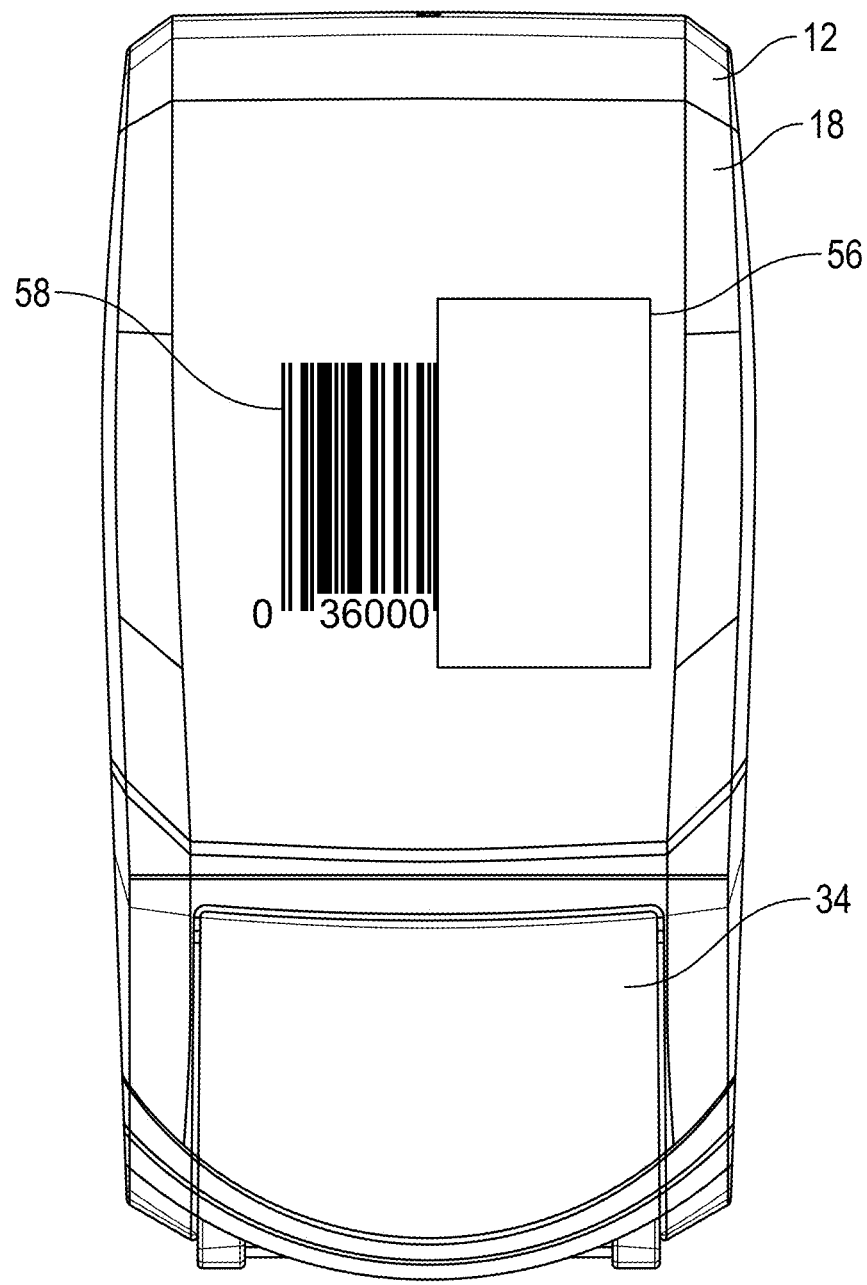
FIG. 15 shows a front view of the liquid dispenser shown in FIG. 14, with the replaceable reservoir removed.
Figure 16:
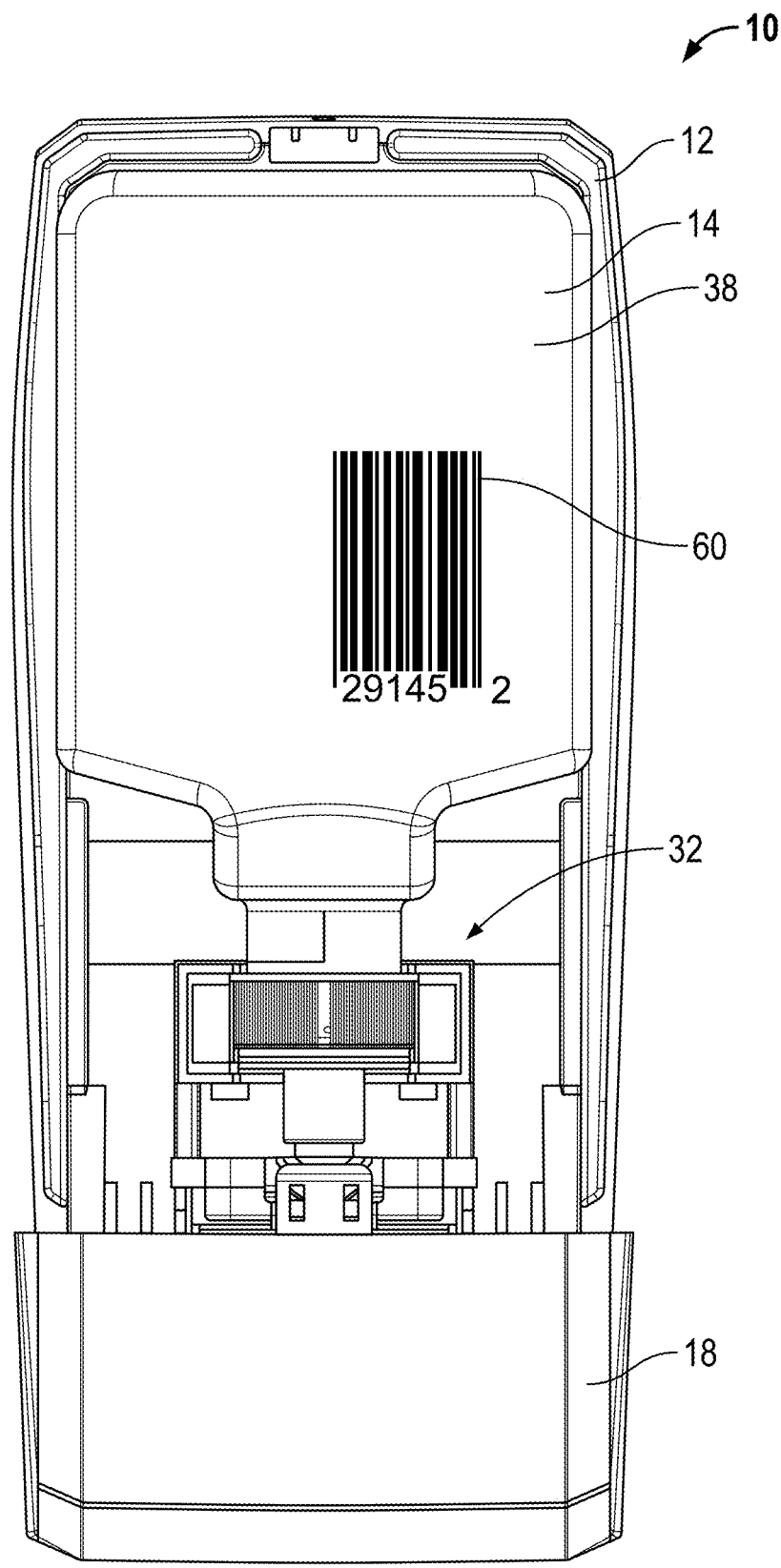
FIG. 16 shows a front view of the liquid dispenser shown in FIG. 14, with a front cover of the housing shown in an open condition.

Reference is now made to FIGS. 14 to 16, which depict a liquid dispenser 10 in accordance with a second preferred embodiment of the invention, wherein like numerals are used to denote like components. The dispenser 10 shown in FIGS. 14 to 16 corresponds identically to the first embodiment described above, with the exception that the combined QR code 48 is replaced by a combined UPC code 54, and the transparent window 20 is replaced by an opening 56 in the cover 18.

As shown in FIG. 15, a first part 58 of the combined UPC code 54 is marked on the front cover 18 of the housing 12 adjacent to the opening 56. As shown in FIG. 16, a second part 60 of the combined UPC code 54 is marked on the surface 38 of the reservoir cartridge 14. The second part 60 is positioned so that, when the cover 18 is in the closed condition as shown in FIG. 14, the second part 60 is visible through the opening 56, and the first part 58 and the second part 60 are positioned adjacent to one another so as to form the combined UPC code 54.

The combined UPC code 54 can be read by a compatible device, such as a barcode scanner 62 as shown in FIG. 14. As in the embodiment described above, the UPC code 54 may contain data such as a discount code, which may be used to encourage customers to purchase refill cartridges 14 from the original manufacturer. The UPC code 54 may also contain data that uniquely identifies the housing 12 and the reservoir 14, and which may be transmitted to a server 52 in some embodiments. In particular, the manufacturer could provide customers with software that, when installed on a compatible device such as a smartphone 50, allows the smartphone 50 to read the combined UPC code 54, and to transmit the data contained in the UPC code 54 wirelessly to the server 52.

It is to be appreciated that the invention is not limited specifically to the use of QR codes and UPC codes. Rather, any suitable optically machine readable code type could be used instead, including other types of linear and two-dimensional barcodes.

Figure 17:
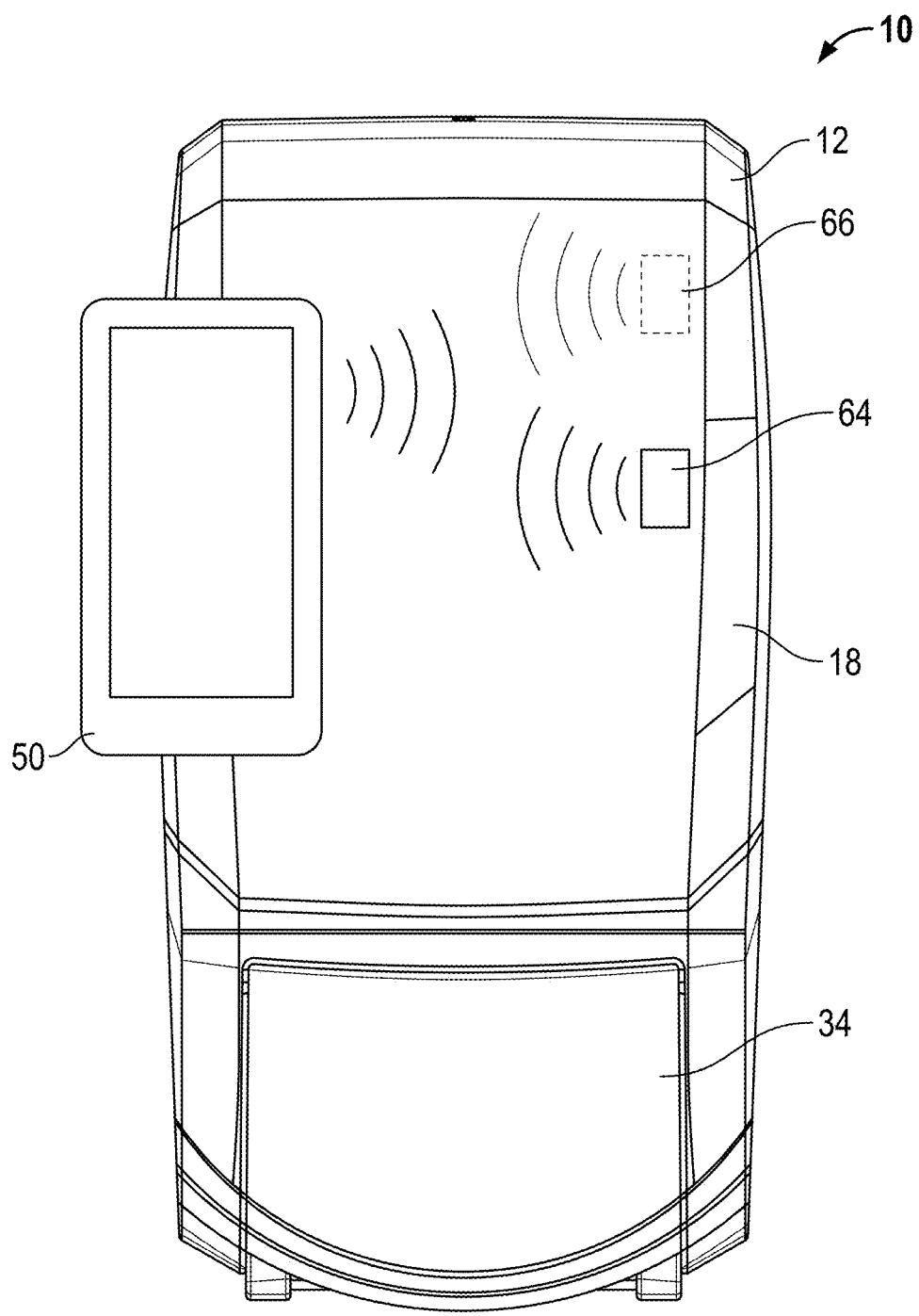
FIG. 17 shows a front view of a liquid dispenser in accordance with a third preferred embodiment of the invention, with a smartphone simultaneously reading RFID tags on a replaceable reservoir and on a housing of the dispenser.
Figure 18:
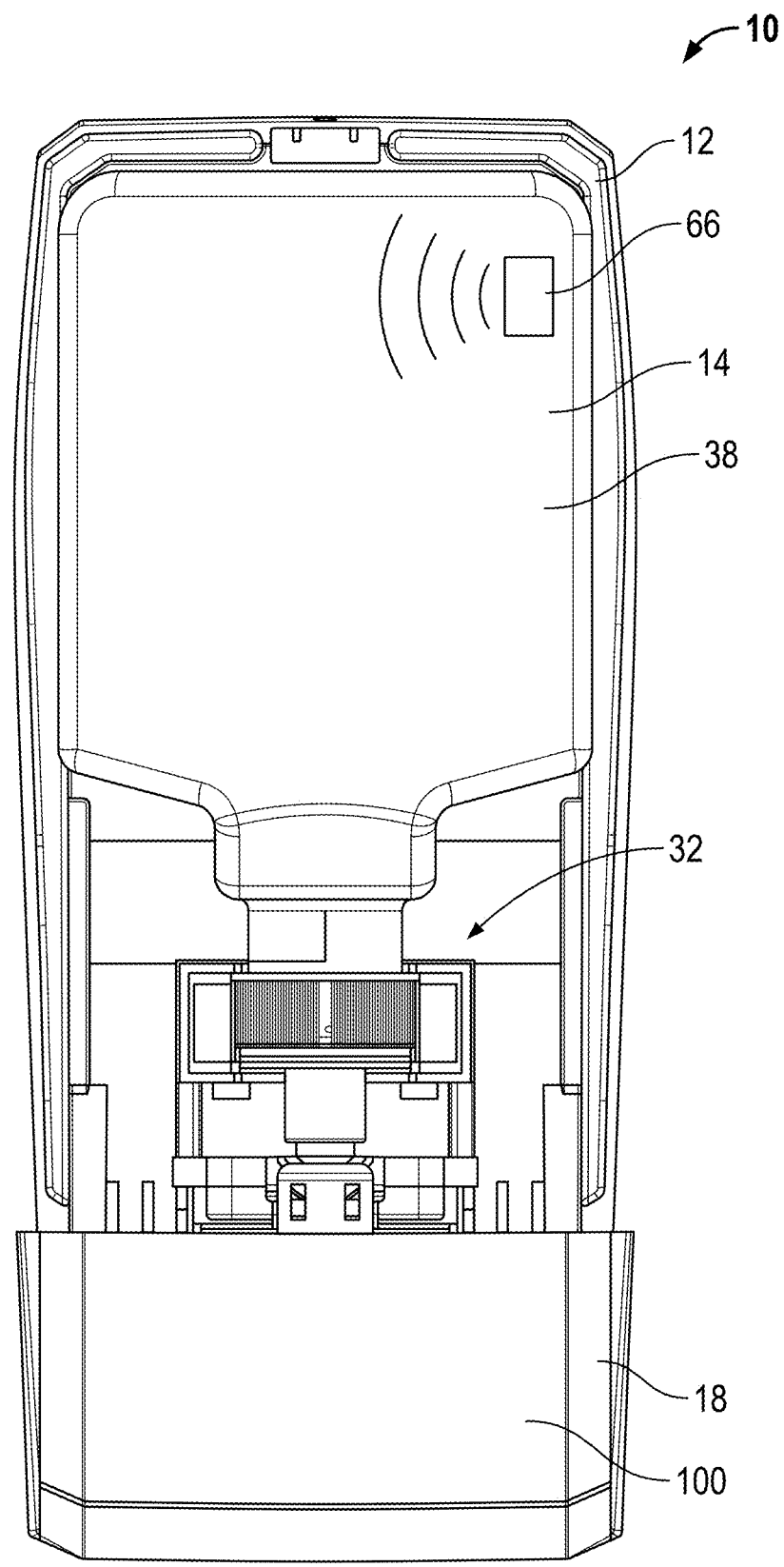
FIG. 18 shows a front view of the liquid dispenser shown in FIG. 17, with a front cover of the housing shown in an open condition.

The invention may furthermore use other types of tags or markings that are machine readable by non-optical means. For example, a third preferred embodiment of the invention that uses non-optical tags is shown in FIGS. 17 and 18, wherein like numerals are used to denote like components. In this embodiment, the housing 12 and the cartridge 14 are provided with a housing RFID tag 64 and a cartridge RFID tag 66, respectively. The tags 64, 66 are positioned so that, when the cartridge 14 is received within the housing 12 and the front cover 18 is in the closed condition, the tags 64, 66 are simultaneously readable by a compatible device, such as an RFID reading smartphone 50, as shown in FIG. 17. The tags 64, 66 may be of the "active" type, with each tag 64, 66 having its own power source, or may be of the "passive" type, with each tag 64, 66 being powered externally by an interrogation signal emitted by an RFID reading device such as the smartphone 50.

The RFID tags 64, 66 preferably contain data that provides certain information, or performs a particular function, only when the two tags 64, 66 are read simultaneously. For example, the cartridge RFID tag 66 could contain encrypted data representing a discount code, and the housing RFID tag 64 could contain a key for decoding the encrypted data, such that the smartphone 50 is only able to read the discount code when both tags 64, 66 are read simultaneously. This could be implemented, for example, by installing software on the smartphone 50 that is configured to recognize the data transmitted from the housing RFID tag 64 as an encryption key, and to apply that key to the encrypted data transmitted from the cartridge RFID tag 66 when both tags are read simultaneously.

In an alternative embodiment, the housing RFID tag 64 could contain data that directs the smartphone 50 to a web address, such as www.example.com/housing123, and the cartridge RFID tag 66 could contain data that specifies a subdirectory, such as/bottle321, so that the smartphone 50 is directed to the address www.example.com/housing123/bottle321 only when both RFID tags 64, 66 are read simultaneously. This embodiment could be used for implementing a usage tracking system, similar to the previously described embodiments. It could also be used for any other function that is usefully triggered by the simultaneous reading of both tags 64, 66, indicating that the cartridge 14 has been received by the housing 12, including those described above in reference to the previous embodiments. In some embodiments, the simultaneous reading of both RFID tags 64, 66 causes the smartphone 50 to perform an action such as recording or transmitting data read from the tags 64, 66. The housing RFID tag 64 and the cartridge RFID tag 66 furthermore preferably include data that uniquely identifies the housing 12 and the cartridge 14, respectively.

Although the embodiment described above uses RFID tags 64, 66 that are read simultaneously, it is to be appreciated that other types of tags or markings could also be used to achieve similar results. For example, in some embodiments of the invention two QR codes may be used in place of the RFID tags 64, 66. The two QR codes could, for example, be read simultaneously using software designed for this purpose.

It will be understood that, although various features of the invention have been described with respect to one or another of the embodiments of the invention, the various features and embodiments of the invention may be combined or used in conjunction with other features and embodiments of the invention as described and illustrated herein.

It is to be appreciated that the term "liquid" as used herein is intended to refer broadly to any flowable substance, including gels, creams, foams, emulsions, suspensions, and the like. Although the preferred embodiments have described the liquid as being a hand cleaning fluid, it is to be appreciated that the invention could also be used with dispensers for other types of products, such as beverages or condiments. The invention could also be with dispensers that dispense non-liquid products.

It is to be appreciated that the liquid dispenser 10 of the present invention need not have the specific constructions that have been shown and described in the preferred embodiments. For example, the housing 12 could have a more open structure, such that the cartridge 14 remains fully or partially visible and accessible when received by the housing 12. In such an embodiment, the housing 12 would not necessarily need to include a window 20 in order for markings on the cartridge 14 to remain visible.

It is to be appreciated that the machine readable codes used by the invention could, in some embodiments, be adapted to be read using light outside of the visible range, such as infrared light.

For embodiments of the invention having a machine readable housing QR code 22, bottle QR code 40, and combined QR code 48, each of the codes 22, 40, 48 should generally use the same mask, the same length of the transfer from the bottle to the housing, and the same error checking and other conserved parameters. It is furthermore to be appreciated that, in some embodiments of the invention, the markings on the cartridge 14 and the housing 12 are not readable on their own, and only form a machine readable code when combined. It will be appreciated that embodiments of the invention that use visible markings to form an optically machine readable code, such as a UPC code or a QR code, may be distinguished from embodiments that do not use visible markings to form an optically machine readable code, such as the described embodiments that incorporate RFID tags.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

We claim:

1. A method of use of a dispenser, the dispenser comprising a housing configured to removably receive a replaceable cartridge containing a product to be dispensed, the method comprising:

generating a machine readable code;

marking the replaceable cartridge with a first marking, the first marking comprising a first part of the machine readable code; and marking the housing with a second marking, the second marking comprising a second part of the machine readable code;

wherein the first marking and the second marking are positioned so that, when the replaceable cartridge is received by the housing, the first marking and the second marking together form the machine readable code; and wherein the machine readable code comprises an optically machine readable code that is detectable from outside of the housing.

2. The method according to claim 1, wherein marking the housing comprises marking the second marking on or adjacent to a light-permeable window of the housing; and wherein marking the replaceable cartridge comprises marking the first marking on a surface of the replaceable cartridge that, when the replaceable cartridge is received by the housing, is positioned behind the light-permeable window, so that the first part of the machine readable code is detectable through the light-permeable window.

3. The method according to claim 1, further comprising: placing the replaceable cartridge within the housing; and reading the machine readable code with a compatible device.

4. The method according to claim 3, further comprising: transmitting data read from the machine readable code to a server.

5. The method according to claim 1, wherein generating the machine readable code comprises at least one of:
(i) encoding, within the machine readable code, information indicating that the replaceable cartridge is received in the housing;
(ii) encoding, within the machine readable code, a housing identifier that uniquely identifies the housing;
(iii) encoding, within the machine readable code, a cartridge identifier that uniquely identifies the replaceable cartridge;
(iv) encoding, within the machine readable code, information that uniquely identifies the combination of the housing and the replaceable cartridge;
(v) encoding a discount code within the machine readable code; and
(vi) encoding a Uniform Resource Locator (URL) within the machine readable code.

6. The method according to claim 4, wherein generating the machine readable code comprises encoding, within the machine readable code, a housing identifier that uniquely identifies the housing; and wherein transmitting the data read from the machine readable code comprises transmitting the housing identifier to the server;
the method further comprising:
recording a location of the housing;
associating the location of the housing with the housing identifier; and
using the housing identifier to associate the data transmitted to the server with the location of the housing.

7. The method according to claim 4, wherein generating the machine readable code comprises encoding, within the machine readable code, a housing identifier that uniquely identifies the housing, and a cartridge identifier that uniquely identifies the replaceable cartridge;
wherein transmitting data read from the machine readable code comprises transmitting the housing identifier and the cartridge identifier to the server;
the method further comprising:
transmitting a date that the machine readable code is read by the compatible device to the server; and
transmitting an account identifier associated with the compatible device to the server.

8. The method according to claim 4, wherein generating the machine readable code comprises encoding, within the machine readable code, data that, when read by the compatible device, instructs the device to initiate an order from a supplier.

9. The method according to claim 4, wherein generating the machine readable code comprises encoding, within the machine readable code, data that represents a storage life of the product;
the method further comprising initiating, after the machine readable code is read by the compatible device, a timer that reflects the storage life of the product.

10. The method according to claim 1, further comprising transmitting data read from the machine readable code to a usage tracking system.

11. The method according to claim 5, further comprising at least one of:
(a) using the discount code to provide a credit to a purchaser of the replaceable cartridge or the housing; and
(b) transmitting data read from the machine readable code to a supplier discount system.

12. The method according to claim 1, wherein the optically machine readable code comprises at least one of:
a barcode;
a linear barcode;
a two-dimensional barcode;
a UPC code; and
a QR code.

13. The method according to claim 1, wherein the machine readable code consists of a single barcode.

14. The method according to claim 1, wherein the replaceable cartridge is a first replaceable cartridge and the machine readable code is a first machine readable code, the method further comprising:
providing a second replaceable cartridge containing the product to be dispensed, the second replaceable cartridge configured to be removably received by the housing;
generating a second machine readable code having a first part and a second part, wherein the first part of the second machine readable code differs from the first part of the first machine readable code, and the second part of the second machine readable code is identical to the second part of the first machine readable code; and
marking the second replaceable cartridge with a third marking, the third marking comprising the first part of the second machine readable code;
wherein the third marking and the second marking are positioned so that, when the second replaceable cartridge is received by the housing, the third marking and the second marking together form the second machine readable code;
wherein generating the first machine readable code comprises encoding, within the first machine readable code, information that uniquely identifies the combination of the housing and the first replaceable cartridge;
wherein generating the second machine readable code comprises encoding, within the second machine readable code, information that uniquely identifies the combination of the housing and the second replaceable cartridge;

the method further comprising:
placing the first replaceable cartridge within the housing;
reading the first machine readable code with a compatible device;
transmitting data read from the first machine readable code to a usage tracking system;
dispensing the product contained in the first replaceable cartridge from the dispenser;
removing the first replaceable cartridge from the housing;
placing the second replaceable cartridge within the housing;
reading the second machine readable code with the compatible device; and
transmitting data read from the second machine readable code to the usage tracking system.

15. The method according to claim 2, wherein the optically machine readable code comprises at least one of:
a barcode;
a linear barcode;
a two-dimensional barcode;
a UPC code; and
a QR code.

16. The method according to claim 1, further comprising:
placing the replaceable cartridge within the housing;
reading the machine readable code with a compatible device; and
transmitting data read from the machine readable code to a usage tracking system;
wherein generating the machine readable code comprises at least one of:
(i) encoding, within the machine readable code, information indicating that the replaceable cartridge is received in the housing;
(ii) encoding, within the machine readable code, a housing identifier that uniquely identifies the housing;
(iii) encoding, within the machine readable code, a cartridge identifier that uniquely identifies the replaceable cartridge; and
(iv) encoding, within the machine readable code, information that uniquely identifies the combination of the housing and the replaceable cartridge.

17. The method according to claim 15, further comprising:
placing the replaceable cartridge within the housing;
reading the machine readable code with a compatible device; and
transmitting data read from the machine readable code to a usage tracking system;
wherein generating the machine readable code comprises at least one of:
(i) encoding, within the machine readable code, information indicating that the replaceable cartridge is received in the housing;
(ii) encoding, within the machine readable code, a housing identifier that uniquely identifies the housing;
(iii) encoding, within the machine readable code, a cartridge identifier that uniquely identifies the replaceable cartridge; and
(iv) encoding, within the machine readable code, information that uniquely identifies the combination of the housing and the replaceable cartridge.

18. The method according to claim 17, wherein the product is a hand cleaning liquid.

19. The method according to claim 1, wherein the product is a hand cleaning liquid.

20. A method comprising:
providing a plurality of dispensers and a plurality of replaceable cartridges containing a product to be dispensed, wherein each of the plurality of dispensers is configured to removably receive at least a subset of the plurality of replaceable cartridges;
marking each of the plurality of replaceable cartridges with a unique first marking; and
marking each of the plurality of dispensers with a unique second marking;
wherein the unique first marking and the unique second marking are configured so that, when one of the plurality of replaceable cartridges is received by one of the plurality of dispensers, the unique first marking and the unique second marking together form a unique optically machine readable code that is detectable from outside of the one of the plurality of dispensers, wherein the unique optically machine readable code contains information that uniquely identifies the combination of the one of the plurality of replaceable cartridges and the one of the plurality of dispensers that are combined to form the unique optically machine readable code.

* * * * *